(12) United States Patent
Witzel

(10) Patent No.: US 9,667,798 B2
(45) Date of Patent: May 30, 2017

(54) ENABLING A COMMUNICATION SERVER TO USE MSC-S RELATED FUNCTIONS

(75) Inventor: Andreas Witzel, Herzogenrath (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 343 days.

(21) Appl. No.: 13/994,099

(22) PCT Filed: Dec. 17, 2010

(86) PCT No.: PCT/EP2010/070100
§ 371 (c)(1),
(2), (4) Date: Jun. 13, 2013

(87) PCT Pub. No.: WO2012/079648
PCT Pub. Date: Jun. 21, 2012

(65) Prior Publication Data
US 2013/0268612 A1    Oct. 10, 2013

(51) Int. Cl.
*H04L 12/50* (2006.01)
*H04M 7/00* (2006.01)
(Continued)

(52) U.S. Cl.
CPC .......... *H04M 7/0045* (2013.01); *H04L 12/50* (2013.01); *H04L 51/04* (2013.01); *H04M 7/0024* (2013.01); *H04W 8/06* (2013.01); *H04W 12/06* (2013.01)

(58) Field of Classification Search
CPC . H04L 12/00; H04L 12/2854; H04L 12/2856; H04L 12/50; H04L 12/28;
(Continued)

(56) References Cited

U.S. PATENT DOCUMENTS 5,577,029 A * 11/1996 Lu ........................... H04W 4/24
455/445
5,621,783 A * 4/1997 Lantto et al. ................. 455/406
(Continued)

FOREIGN PATENT DOCUMENTS

| CN | 101488926 A | 7/2009 |
|---|---|---|
| EP | 1 398 979 A1 | 3/2004 |
| EP | 1 617 609 A1 | 1/2006 |

OTHER PUBLICATIONS

Circuit Switching, Telecom ABC, 2005.*
(Continued)

*Primary Examiner* — Brian J Gillis
*Assistant Examiner* — Boris Grijalva Lobos
(74) *Attorney, Agent, or Firm* — Sage Patent Group

(57) ABSTRACT

The invention relates to a method of registering a communication client at a communication server, wherein the communication client is associated to a mobile terminal and wherein the communication server is associated to a mobile switching node of a circuit switched network, the method comprises the steps of: initiation a connection between the communication server and the communication client, sending identification information to the communication server by the communication client via the connection, interrogating an authentication module of the mobile switching node to perform a user authentication by the communication server, fetching subscriber information from a database by the communication server, and sending subscriber information to the communication client via the connection.

28 Claims, 7 Drawing Sheets

(51) Int. Cl.
*H04W 8/06* (2009.01)
*H04W 12/06* (2009.01)
*H04L 12/58* (2006.01)

(58) Field of Classification Search
CPC ......... H04L 12/56; H04L 51/00; H04L 51/04; H04L 51/06; G06F 15/16; G06F 15/173; G06F 15/177; H04M 1/00; H04M 7/00; H04M 7/0024–7/0057; H04M 3/00; H04M 15/00; H04M 17/00
USPC ........................................ 709/201, 203, 206
See application file for complete search history.

(56) References Cited

U.S. PATENT DOCUMENTS

| | | | | |
|---|---|---|---|---|
| 5,838,782 | A * | 11/1998 | Lindquist | H04Q 3/0025 370/401 |
| 5,903,726 | A * | 5/1999 | Donovan | H04W 4/12 709/206 |
| 5,924,030 | A * | 7/1999 | Rautiola et al. | 455/426.1 |
| 6,091,949 | A * | 7/2000 | Sanchez | H04M 3/54 379/211.02 |
| 6,101,393 | A * | 8/2000 | Alperovich | H04M 3/533 370/278 |
| 6,125,281 | A * | 9/2000 | Wells et al. | 455/466 |
| 6,167,256 | A * | 12/2000 | Yla-Outinen et al. | 455/417 |
| 6,349,205 | B1 * | 2/2002 | Fang et al. | 455/419 |
| 6,546,242 | B1 * | 4/2003 | Alperovich et al. | 455/418 |
| 6,611,516 | B1 * | 8/2003 | Pirkola | H04M 7/1235 370/328 |
| 6,810,250 | B2 * | 10/2004 | Jo et al. | 455/433 |
| 6,993,324 | B1 * | 1/2006 | Gilbert | 455/412.1 |
| 7,058,036 | B1 * | 6/2006 | Yu | H04L 12/5835 370/335 |
| 7,171,199 | B1 * | 1/2007 | Rahman | 455/433 |
| 7,215,754 | B1 * | 5/2007 | Woodson et al. | 379/221.09 |
| 8,041,335 | B2 * | 10/2011 | Khetawat et al. | 455/404.2 |
| 8,543,107 | B1 * | 9/2013 | Bertz et al. | 455/435.1 |
| 8,861,525 | B1 * | 10/2014 | Durand et al. | 370/392 |
| 8,886,183 | B2 * | 11/2014 | Lindholm et al. | 455/433 |
| 2001/0019545 | A1 * | 9/2001 | Okubo et al. | 370/331 |
| 2002/0025821 | A1 * | 2/2002 | Clapton et al. | 455/456 |
| 2002/0078185 | A1 * | 6/2002 | Swerup et al. | 709/220 |
| 2002/0099848 | A1 * | 7/2002 | Lee | 709/241 |
| 2002/0155828 | A1 * | 10/2002 | Tuomainen et al. | 455/414 |
| 2003/0036392 | A1 * | 2/2003 | Yukie | 455/461 |
| 2003/0076819 | A1 * | 4/2003 | Emerson, III | 370/352 |
| 2003/0103506 | A1 * | 6/2003 | Keller | 370/392 |
| 2004/0023689 | A1 * | 2/2004 | Ahonen | 455/558 |
| 2004/0066769 | A1 * | 4/2004 | Ahmavaara et al. | 370/338 |
| 2004/0090958 | A1 * | 5/2004 | Park et al. | 370/389 |
| 2004/0127204 | A1 * | 7/2004 | Belmont | 455/418 |
| 2004/0142689 | A1 * | 7/2004 | Boda | 455/432.1 |
| 2004/0203921 | A1 * | 10/2004 | Bromhead et al. | 455/456.1 |
| 2004/0243941 | A1 | 12/2004 | Fish | |
| 2004/0248546 | A1 * | 12/2004 | Bhaumick | 455/404.2 |
| 2005/0085250 | A1 * | 4/2005 | Lee et al. | 455/509 |
| 2005/0136896 | A1 * | 6/2005 | Ward | H04L 12/66 455/413 |
| 2005/0282559 | A1 * | 12/2005 | Erskine et al. | 455/456.4 |
| 2006/0069609 | A1 * | 3/2006 | Chiou | 705/13 |
| 2006/0153355 | A1 * | 7/2006 | Wang | H04M 3/42017 379/215.01 |
| 2007/0255809 | A1 * | 11/2007 | Chiba | 709/219 |
| 2007/0281687 | A1 * | 12/2007 | Jiang | 455/433 |
| 2008/0117884 | A1 * | 5/2008 | Ishii et al. | 370/338 |
| 2008/0153523 | A1 * | 6/2008 | Febonio | H04W 4/14 455/466 |
| 2009/0047981 | A1 * | 2/2009 | Khanna | 455/466 |
| 2009/0225732 | A1 * | 9/2009 | Begall | H04W 88/184 370/338 |
| 2009/0319611 | A1 * | 12/2009 | Turakhia | 709/204 |
| 2010/0062751 | A1 * | 3/2010 | Russell | H04W 8/06 455/417 |
| 2010/0189004 | A1 * | 7/2010 | Mirandette et al. | 370/252 |
| 2010/0208701 | A1 * | 8/2010 | Tinnakornsrisuphap et al. | 370/331 |
| 2010/0279733 | A1 * | 11/2010 | Karsten et al. | 455/552.1 |
| 2011/0125925 | A1 * | 5/2011 | Bouthemy et al. | 709/250 |
| 2011/0138458 | A1 * | 6/2011 | Kumar et al. | 726/15 |
| 2012/0094642 | A1 * | 4/2012 | Popperl | H04M 3/42076 455/415 |
| 2012/0196600 | A1 * | 8/2012 | Mizukoshi | 455/435.1 |
| 2014/0280797 | A1 * | 9/2014 | Tiger et al. | 709/220 |
| 2015/0319300 | A1 * | 11/2015 | Arbe | H04M 3/42365 370/259 |

OTHER PUBLICATIONS

Enabling Services through Identity Management (Mar. 30, 2008), Guillermo Cajigas.*
Wikipedia, the free encyclopedia, "Extensible Messaging and Presence Protocol (XMPP)", Jan. 19, 2015, 11 pages. Retrieved from: http://en.wikipedia.org/wiki/XMPP.
P. Saint-Andre: "Extensible Messaging and Presence Protocol (XMPP): Core", Network Working Group Request for Comments: 3920, Category: Standards Track; Oct. 2004, 90 pages.
P. Saint-Andre: "Extensible Messaging and Presence Protocol (XMPP): Instant Messaging and Presence", Network Working Group Request for Comments: 3921, Category: Standards Track; Oct. 2004, 107 pages.
P. Saint-Andre: "Mapping the Extensible Messaging and Presence Protocol (XMPP) to Common Presence and Instant Messaging (CPIM)", Network Working Group Request for Comments: 3922, Category: Standards Track; Oct. 2004, 34 pages.
P. Saint-Andre: "End-to-End Signing and Object Encryption for the Extensible Messaging and Presence Protocol (XMPP)", Network Working Group Request for Comments: 3923, Category: Standards Track; Oct. 2004, 27 pages.
International Search Report, Application No. PCT/EP2010/070100, Sep. 12, 2011.
Written Opinion of the International Searching Authority, Application No. PCT/EP2010/070100, Sep. 12, 2011.
Written Opinion of the International Preliminary Examining Authority, Application No. PCT/EP2010/070100, Nov. 29, 2012.
International Preliminary Report on Patentability, PCT/EP2010/070100, Apr. 12, 2013.

* cited by examiner

ENABLING A COMMUNICATION SERVER TO USE MSC-S RELATED FUNCTIONS

CROSS REFERENCE TO RELATED APPLICATION

This application is a 35 U.S.C. §371 national stage application of PCT International Application No. PCT/EP2010/070100, filed on 17 Dec. 2010, the disclosure and content of which is incorporated by reference herein in its entirety. The above-referenced PCT International Application was published in the English language as International Publication No. WO 2012/079648 A1 on 21 Jun. 2012.

TECHNICAL FIELD

The invention relates registering a communication client at a communication server, wherein the communication client is associated to a mobile terminal of a circuit-switched network which is associated to a mobile switching node of the circuit-switched network. The invention relates further supporting a communication between a first communication client which is registered at a first communication server and a second communication client which is registered at a second communication server, wherein the first communication client is associated to a mobile terminal of a circuit-switched network which is associated to a mobile switching node of the circuit-switched network.

BACKGROUND

The Extensible Messaging and Presence Protocol (XMPP) is an open Extensible Markup Language (XML) protocol for near-real-time messaging, presence, and request-response services. These services are also named as instant messaging services. The core features of the XMPP are defined in the IETF standard RFC 3920. The basic syntax and semantics were developed originally within the Jabber open-source community. Although XMPP is not wedded to any specific network architecture, to date it usually has been implemented via a client-server architecture wherein a client utilizing XMPP accesses a server over a TCP connection, and servers also communicate with each other over TCP connections. Being an open standard, XMPP has got quite attraction in the open source community world wide and numerous free software packages exist implementing XMPP clients and XMPP server on different platforms. Some companies are basing their chat and voice offerings on XMPP specifications. FIG. 1 shows a schematic diagram of a mobile communication network which is connected to a TCP/IP-based network 100, which can be the Internet or any other TCP/IP based network. In this embodiment, three XMPP servers 111, 121, 131 are connected to the Internet 100. Two XMPP clients 112, 122 are associated to two of the XMPP server 111, 121 via a TCP/IP connection. The XMPP clients 112, 122 can e.g. be a personal computer or a laptop which is connected to the internet 100 via a normal dial-connection. The address 113 of the first XMPP client 112 "client1" is "client1@XMPPserver1.domain/device1" wherein the address 123 of the second XMPP client 122 is "client2@XMPPserver2.domain/device2". In FIG. 1 and in FIG. 4, the addresses 113, 123, 133 are disclosed in a simplified form because the domain indicator and the device indicator are missing for better view. These addresses are in accordance with the standardized XMPP JID (Jabber identity) which is a combination of a user ID, a server ID and a device ID. By these addresses 113, 123, 133 all XMPP clients 112, 122, 132 can be identified and data can be routed via the internet. FIG. 1 further discloses a mobile communication network, wherein only selected components of the mobile communication network are depicted. A mobile terminal or user equipment 18 comprises a XMPP client 132. The XMPP client 132 can be an application which is stored in the UE 18. The XMPP client 132 is associated to a XMPP server 131 via a TCP-based connection. The address 133 of the XMPP client 132 is "client3@XMPPserver3.domain/UEdevice". This connection can be realized by a wireless LAN connection, wherein the UE 18 is associated to a WLAN router 19 which is further connected to the Internet 100. Another possibility is that the UE 18 is connected via the radio network 17 to a packet switched (PS) network or to an evolved packet switched (EPS) network. One setup of a PS network is depicted in FIG. 1 by a Serving GPRS Support Node (SGSN) node 15 and Gateway GPRS Support Node (GGSN) 16 which is linked via an IP based core network connection and via the Internet 100 to the XMPP server 131. The embodiment according FIG. 1 further discloses a connection between the SGSN node 15 of a packet switched network and a mobile switching node 14, which can be a MSC-S node 14 of a circuit switched (CS) network. This link between both nodes, which is called Gs interface, depicts the possibility of transferring data between both networks. A further packet switched network is the Evolved Packet Core (EPC) network, wherein one node is the Mobility Management Entity (MME), which can be linked to the MSC-S via a SGs interface. FIG. 1 does not depict further gateway nodes which might be necessary to implement a connection between a circuit-switched network and a packet switched network.

FIG. 2 shows a block diagram of a prior-art mobile switching node 14, which is in this embodiment a MSC-S node 14, wherein only selected parts are depicted. The MSC-S 14 comprises a GSM call control function 143 which contains mobile traffic coordinators for originating and/or terminating calls and emergency calls. The coordinators are mainly used for call transaction setup, call forwarding, call supervision and call release. It allows also direct and handle calls towards other circuit switched networks. The GSM call control function 143 is linked with the core network interface 145 which hosts the core network interfaces of the MSC-S. The core network interface 145 analyses incoming signalling which is either forwarded to another node in the core network or handled locally and terminated at a radio network interface. For outgoing signalling a routing function 146 is consulted to determine the next destination node and the physical interface to reach it. The core network interface 145 is IP (Internet Protocol) based. The GSM call control function 143 is further connected to a GSM mobility function 142 which allows the mobile terminal to roam between radio location areas and to continue ongoing calls also across radio network borders. One main function is the handover procedure to hand over a mobile terminal from one area to another. The GSM mobility function 142 or mobility management function therefore contains a logic coordinator for mobility, roaming and handover procedures and handles the location updating functions and handover functions. Furthermore the GSM mobility function 142 contains functions for packing or unpacking of signalling messages to the terminal and to the radio network belonging to mobility. Signalling messages can be used e.g. in case of authentication, identification and location updating.

The GSM mobility function 142 is connected to the A-/Iu-interface function 141 which hosts the radio network interface resources of the MSC-S 14.

The MSC-S 14 further comprises a charging function 144 which is connected to the GSM call control function 143 and the core network interface 145. The charging function 144 is a basic function in the MSC-S 14 to collect traffic case related data to be used for offline billing.

The MSC-S 14 further comprises a VLR data storage 147 which stores the subscriber data. The VLR 147 is connected to a home location register 4 (HLR) which is a central database that contains details of each mobile phone subscriber that is authorized to use the core network.

The MSC-S further comprises a GSM authentication component 148 which implements the GSM authentication algorithm. The GSM authentication component 148 is also connected to the HLR 4 to receive and verify authentication data from the central database.

FIG. 3 depicts a block diagram of a well known XMPP server 131. The XMPP server 131 contains a XMPP stanzas router 1311 which is the backbone of the XMPP server 131. The XMPP stanzas router 1311 accepts connections from XMPP server components and passes XML (extended markup language) packets between XMPP server components. A client to server component (c2s) 1312 handles communication with associated XMPP clients. The XMPP stanzas router 1311 is connected to a XMPP session manager 1316. The session manager 1316 implements the bulk of the instant messaging features like message passing, presence, roster and subscription. The session manager 1316 is connected to data storage in order to provide persistent data storage. The associated data storage is not depicted in FIG. 3. It could be located outside the XMPP server 131 or it could be part of the XMPP server 131. Additionally the session manager 1316 handles the XMPP extensions of service discovery and privacy lists. A c2s component 1312 is connected to the XMPP stanzas router 1311 and is e.g. responsible for connecting XMPP clients 112, 122, 132 to the XMPP server 131, passing communication packets to a session manager 1316 of the XMPP server 131, authenticating XMPP clients 112, 122, 132, registering users and triggers activity with the session manager 1316. A server to server (s2s) component 1315 is connected to the XMPP stanzas router 1311 and handles communications with external XMPP servers by passing communication packets between other internal components and external servers. The s2s component 1315 further performs dial-back function to authenticate remote XMPP servers. A multi user chat (muc) 1314 is connected to the XMPP stanzas router 1311 to implement support for chat rooms. A publish subscribe component (pubsub) 1313 implements a generic functionality for providing presence. The pubsub component 1313 is connected to the Stanzas router 1311. The XMPP server 131 is connected via a TCP/IP connection to the Internet 100 such that it possible to reach this server from any other device connected to the Internet 100. The s2s component 1315 and the c2s component 1312 communicate via the Internet 100 with external clients 112, 122, 132 and external server 111, 121.

In the state of art, if two mobile terminals want to communicate with each other via their XMPP clients, the communication has to be routed via the Internet, even if both mobile terminals are associated to the same mobile network. Operators of mobile communication networks might have the need to run more efficiently instant communication services.

SUMMARY

It is an object of the present invention to improve the prior art instant communication service. This object is achieved by the independent claims. Advantageous embodiments are described in the dependent claims.

One embodiment of the invention relates to a method of registering a communication client at a communication server, wherein the communication client is associated to a mobile terminal and wherein the communication server is associated to a mobile switching node of a circuit switched network. The method comprises the steps of initiating a connection between the communication server and the communication client, sending identification information to the communication server by the communication client via the connection, interrogating an authentication module of the mobile switching node to perform a user authentication by the communication server, fetching subscriber information from a database by the communication server and sending subscriber information to the communication client via the connection. The communication server could be a XMPP server and the communication client could be a XMPP client but there might be also other communication protocols possible. The switching node could be a MSC-S of a circuit switched network. The database could be a Visitor Location Register, VLR, of the MSC-S.

In an embodiment of the invention, the database, which could be the VLR, fetches the subscriber information from a central database. The central database can be located anywhere in the network and is reachable by any VLR or MSC-S database. If the subscriber information is stored in a central database, which might be the Home Location Register (HLR), a subscriber can be allocated to any communication server or MSC-S because it is possible that the communication server or the MSC-S will fetch the needed subscriber data from the centralized database.

The communication server is using components of the MSC-S during the registration process. This will reduce the complexity of the XMPP enhanced MSC-S and the costs for implementing an open communication service like XMPP into a mobile communication network. By implementing such communication service, already established data links and network capacities could be used to transfer communication data. The control of the XMPP services, like Voice-over-IP (VoIP) or subscriber buddy list, is under control of the mobile network operator to use several synergies to implement this service into the mobile network. By using an open communication protocol like XMPP, there is a high acceptance in the user-community because of the transparency of this communication protocol. It is easy to implement further services from other vendors, based on this standard, into the network.

In a further embodiment of the invention, parts of the identification information is determined from a subscriber identity module, SIM, associated with the mobile terminal. The SIM could be a SIM card which comprises e.g. the Mobile Subscriber Integrated Services Digital Network Number, MSISDN or the International Mobile Subscriber Identity, IMSI. The information can be derived from the SIM to construct the identification information or parts of it. It is further possible to derive one part of the identification information from the International Mobile Equipment Identity, IMEI. Another possibility to build parts of the identification information is the use of the Access Point Name, APN.

The advantage of building the identification information from information stored at the SIM card or in the mobile terminal is the reuse of already known information. It is not necessary for a user of a XMPP client to insert a new user name or the like. It is an automatic process to create identification information like the Jabber ID from available information on the mobile terminal.

In a further embodiment of the invention, at least one part of the identification information is stored in a Domain Name System, DNS, server in combination with an IP-address of the communication server. The part of the identification information can be the domain name which is stored in the DNS server in combination with an IP-address. This could be done in a table wherein every domain name is correlated to an IP-address such that if an external client or server wants to send data to a client which is located in a specific domain, it fetches the IP address of the specific domain from the DNS server and sends the data to the server related to the fetched IP-address.

In a further embodiment of the invention the mobile terminal is CS connected via a radio network to the mobile switching node. The method further comprises the step of sending the IP-address of the communication server, which is associated to the mobile switching node to the DNS server in combination with the at least one part of the identification information of the communication client. This will have the effect that if the mobile terminal changes the location and must be attached to a new mobile switching node, the communication server which is allocated to the new mobile switching node, should take over the server function for the communication client which is allocated to the mobile terminal. Therefore the new communication server can use the resources of the new mobile switching node when a communication via the communication client is established.

In a further embodiment of the invention, the method of registering a communication client at a communication server the communication client receives a text message by the communication client which contains configuration information. This text message could be a Short Message Service, SMS. The sending of configuration information to the communication client leaves more freedom in the way the identification information is constructed. As an advantage, a subscriber can be distributed to multiple domains or domains different to the APN domain.

The invention also relates to a method of supporting a communication between a first communication client which is registered at a first communication server via a connection and a second communication client which is registered at a second communication server, wherein the first communication client is associated to a mobile terminal. The communication server is associated to a mobile switching node of a circuit switched network. The method comprises the steps of sending of communication data between the first communication client and the first communication server over the connection and routing communication data between the first communication server and the second communication server over a core network interface of the mobile switching node. Again there is the advantage of reusing already established components and network capacity. The communication server could be a XMPP server and the communication client could be a XMPP client but there might be also other communication protocols possible. The switching node could be a MSC-S of a circuit switched network.

In a further embodiment, the mobile terminal is CS connected via a radio network to the mobile switching node. The method further comprises the step of sending the IP-address of the communication server, which is associated to the mobile switching node, to the Domain Name System, DNS, server in combination with identification information of the communication client. Advantageously the method further comprises the step of fetching the addresses of the first communication client and the second communication client from the DNS server when communication data is routed between the first communication server and the second communication server. Therefore it is possible that a mobile terminal, comprising the first communication client, can be allocated to a new mobile switching node with a new allocated communication server because the IP-address of the new communication server will be send to the DNS server and replaces the old IP-address which was correlated to the current identification information.

In a further embodiment the core network interface is an IP core network interface. Further the connection is a Transmission Control Protocol, TCP, or a Hypertext Transfer Protocol (HTTP) based connection. The communication according to the XMPP standard is based on the TCP protocol or the HTTP protocol (called BOSH) which is setup on the IP protocol.

If the core network interface is also IP based, no protocol transfer must be performed. This will reduce latency in the network.

In a further embodiment of the invention, the method further comprises the step of providing charging data to a charging function of the mobile switching node based on the communication data. The implementation of the already used charging function of an MSC-S in a mobile communication makes it easier to implement the charging of the XMPP-services like VoIP or the like.

In a further embodiment the communication server is integrated in the mobile switching node. This will reduce the costs for implementing the communication service into the mobile network because the communication server could use several components of the MSC-S including e.g. also the power supply. "Integrated" means that the communication server is a hardware module in the MSC-S or a plug-in board which could be inserted into a rack which comprises among others several MSC-S plug-in boards.

The invention further relates to a mobile switching node of a circuit-switched network, CS, comprising a communication server which is adapted to register with a communication client over a client to server component, wherein the communication client is associated to a mobile terminal. The client to server component comprises a communication unit, adapted to establish a connection to the communication client, a receiving unit, adapted to receive identification information from the communication client by the connection, an interrogation unit, adapted to interrogate an authentication module of the mobile switching node to perform a user authentication, a fetching unit, adapted to fetch subscriber information from a database, and a sending unit, adapted to send subscriber information to the communication client via the connection.

The invention further relates to a mobile switching node of a circuit-switched network, CS, comprising a core network interface adapted to connect the mobile switching node to the circuit-switched network and a communication server. The communication server is adapted to communicate to a communication client which is associated to a mobile terminal. The communication server comprises a client to server component adapted to send communication data to the communication client. The core network interface is further adapted to route communication data from a server to server component of the communication server to a further communication server.

The mobile switching node, which could be a MSC-S, could be adapted to perform all the steps of the before mentioned methods.

The present invention also concerns computer programs comprising portions of software codes in order to implement the method as described above when operated by a respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
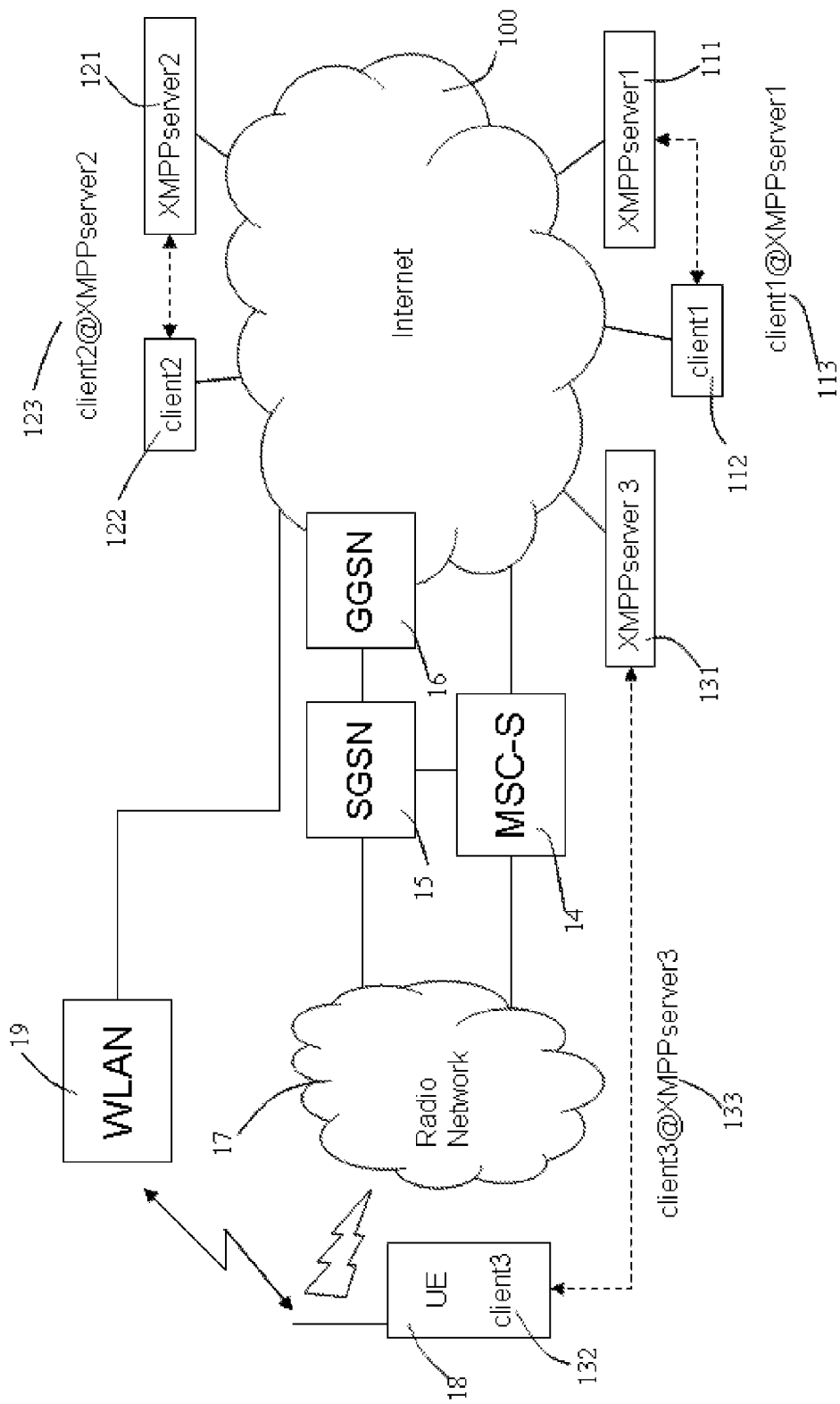
FIG. 1 shows a schematic diagram of a mobile communication network which is connected to a TCP/IP-based network according to the prior art.
Figure 2:
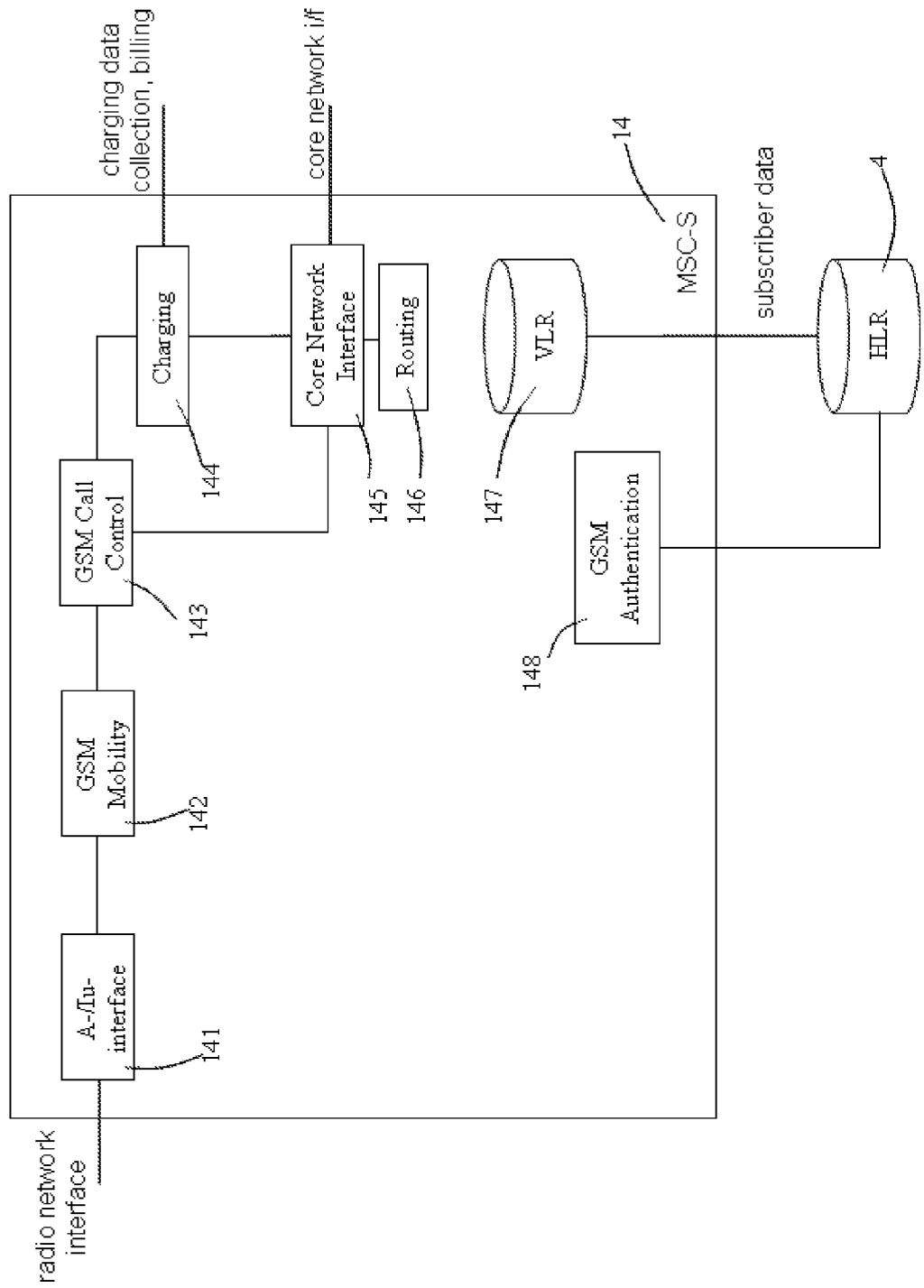
FIG. 2 shows a block diagram of an embodiment of a mobile switching node without an integrated communication server according to the prior art.
Figure 3:
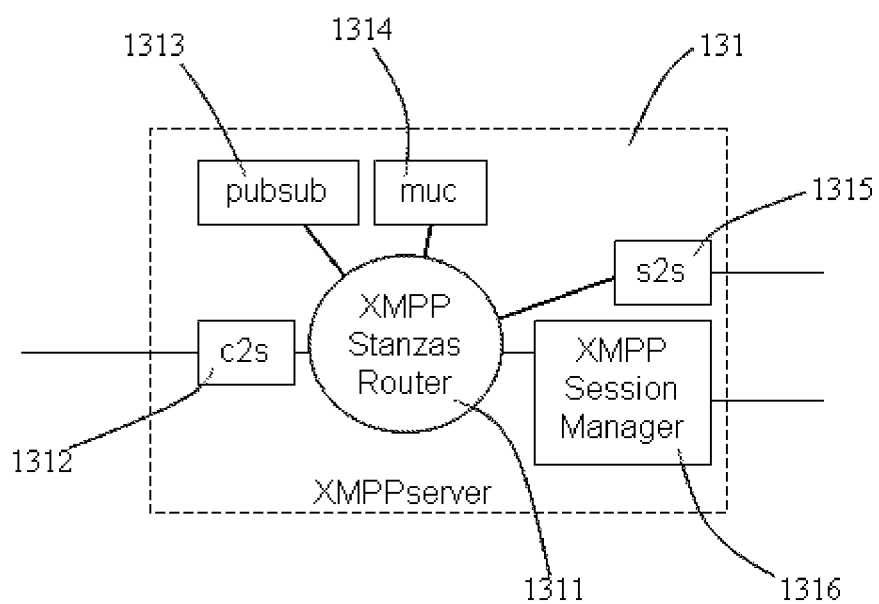
FIG. 3 shows a block diagram of an embodiment of a communication server according to the prior art.
Figure 4:
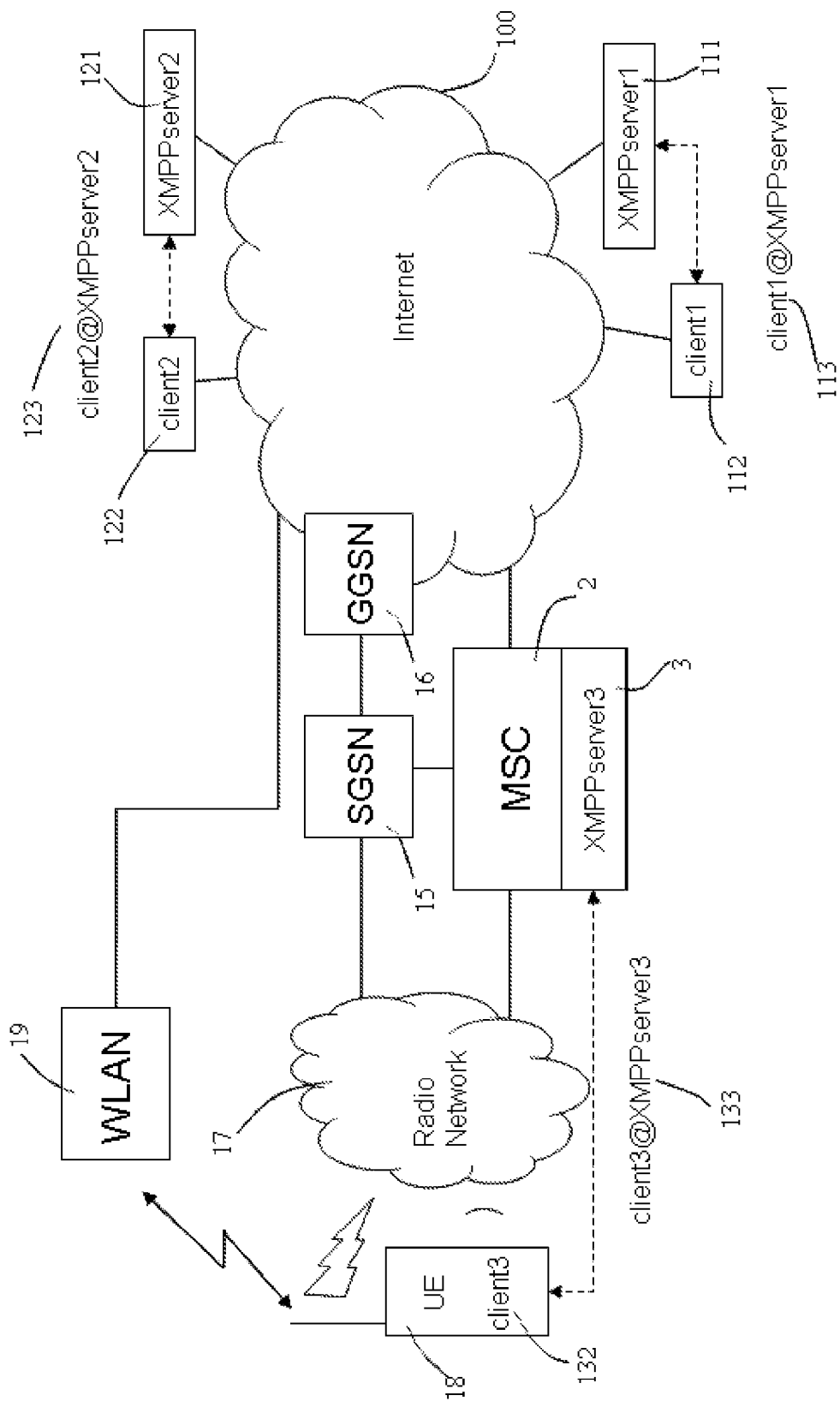
FIG. 4 shows a schematic diagram of a mobile communication network which is connected to a TCP/IP-based network, according to an embodiment of the invention.

FIG. 4 depicts one embodiment of the invention. The third XMPP server 3 is associated to the MSC-S 2 of a mobile communication network which can also be understood as an MSC. It is possible that the XMPP server 3 is an integral part of the MSC-S 2. Therefore the MSC-S 2 is enhanced by the XMPP server 3. The XMPP server 3 can also be a server node which is logically associated to the MSC-S 2 to use some of the MSC-S functions. The embodiment according FIG. 4 further discloses a Gs-connection between the SGSN node 15 of a packet switched network and the MSC node 2 of a circuit switched network. This link between both nodes depicts the possibility of transferring data between both mobile networks. FIG. 4 does not depict further gateway nodes which might be necessary to implement a connection between a circuit-switched network and a packet switched network. Another alternative for a packet switched network is the EPC network which comprises a MME. The MME is connected via a SGs interface to the MSC-S 2. This alternative is not depicted in FIG. 4.

Figure 5:
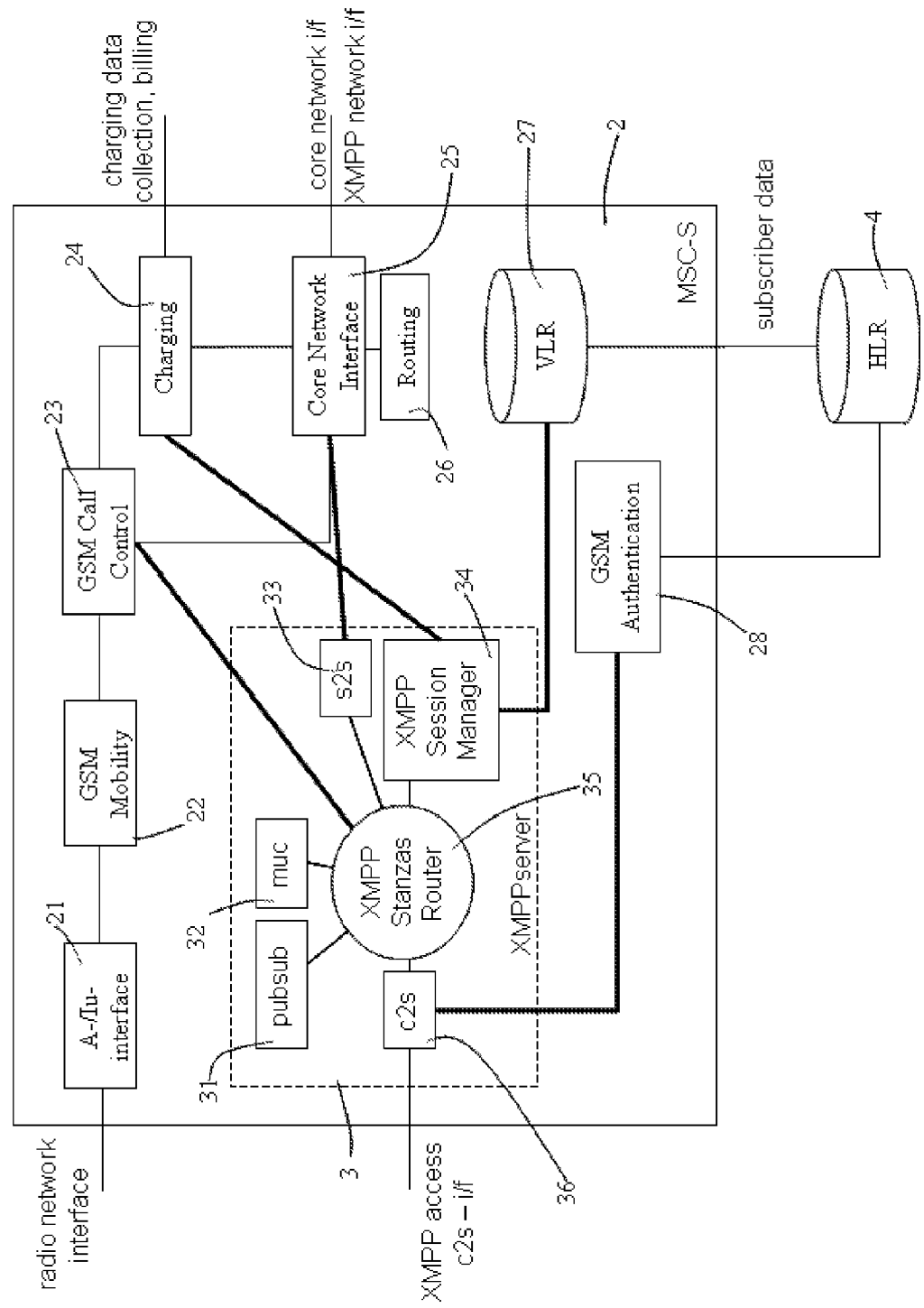
FIG. 5 shows a block diagram of an embodiment of a mobile switching node with an integrated communication server.

FIG. 5 depicts one embodiment of MSC-S 2 with an integrated XMPP server 3. The XMPP server 3 can be a separate module which is inserted as a hardware component into the MSC-S hardware. The XMPP server 3 could also be a separate plug in card which can be inserted into a rack which comprises among others several MSC-S plug-in cards. The XMPP server 3 must be logically associated to the MSC-S 2. In the embodiment of FIG. 5 the XMPP stanzas router 35 of the XMPP server 3 is connected to the GSM call control function 23 of the MSC-S for XMPP-CS interworking to perform the conversion between the XMPP protocol and the CS protocol at breakout. Further the XMPP session manager 34 of the XMPP server 3 is connected to the charging function 24 of the MSC-S 2 to add XMPP related data to the charging information. E.g. when the session manager 34 reports information about a chat session to the charging function of the MSC-S 2 the operator of this mobile network is able to charge e.g. the duration of the chat or the number of chat messages.

The XMPP session manager 34 is further connected to the visitor location register (VLR) 27 of the MSC-S 2. The VLR 27 is associated to the MSC-S 2 and can be located inside the MSC-S 2 or can be an outside entity which is e.g. inserted into a rack which comprises among others the MSC-S 2 plug in card. This subscriber storage area can now be used as persistent data storage for the XMPP protocol such as offline messages or privacy lists.

The GSM authentication function 28 of the MSC-S 2 is connected via the c2s component 36 with the XMPP stanzas router 35. The GSM authentication function 28 can be used by the c2s component 36 to authenticate a XMPP client or user.

The XMPP stanzas router 35 is connected via the s2s component 33 with the core network interface 25 and the routing function 26 of the MSC-S. The routing function 26 acts in support of the s2s component to resolve hostnames for the s2s component 25 as part of the XMPP dial-back authentication. The dial-back authentication, as mentioned in the RFC standard 3920, is for verification of the identity of an originating XMPP server. The s2s component 33 can reuse the existing IP network interface of the MSC-S node and the core network of the mobile communication network to send communication data to another XMPP server 111, 121 which can be located anywhere in the Internet 100 or in another node of the same or another mobile communication network.

Figure 6:
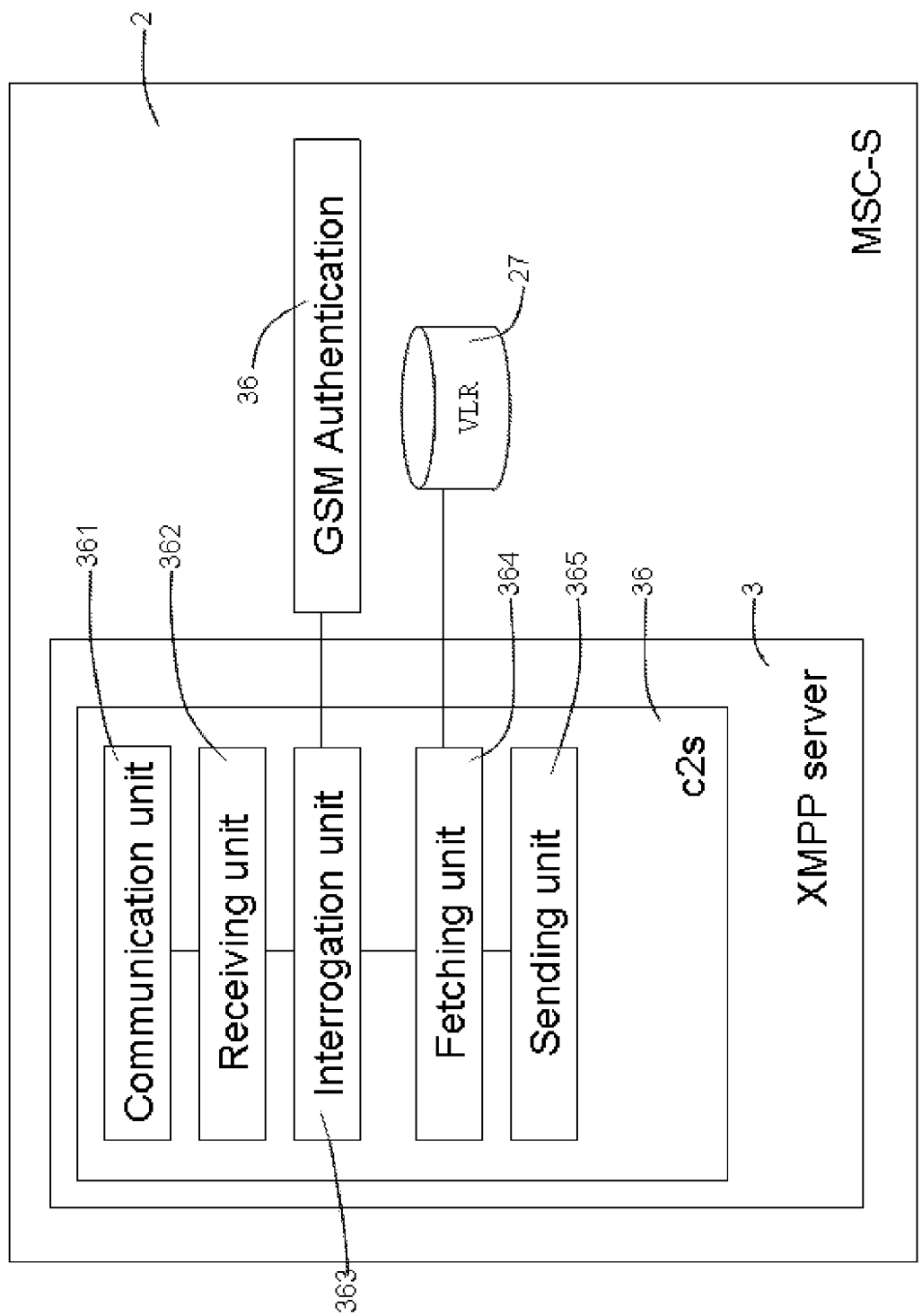
FIG. 6 shows a block diagram of an embodiment of a mobile switching node with an integrated communication server.

FIG. 6 depicts an embodiment of a mobile switching node, MSC-S, 2 of a circuit-switched network, CS, comprising a communication server 3. The communication server 3 is associated to the MSC-S 2 (e.g. integrated into the MSC-S 2). The communication server 3, which could be a XMPP server, is adapted to register with a communication client 132 which can be a XMPP client over a client to server component 36. The XMPP client 132 is not shown in this figure. The client to server component 36 comprises a communication unit 361, adapted to initiate or establish a connection to the XMPP client 132. The establishment of the connection could be initiated by the XMPP client 132 or by the XMPP server 3. The establishment of a communication means that the communication unit 361 helps to build-up a communication with the XMPP client 132. The client to server component 36 further comprises a receiving unit 362 which is adapted to receive identification information from the XMPP client 132 via the connection. The identification information could be the Jabber ID or any other kind of identification, which is described in some of the next paragraphs. Further the client to server component 36 comprises an interrogation unit 363 which is adapted to interrogate an authentication module 28 of the MSC-S 2 to perform a user authentication. The client to server component 36 further comprises a fetching unit 364, adapted to fetch subscriber information from a database 27. The database is in this embodiment the VLR of the MSC-S 2. A sending unit 365 at the client to server component 36 is adapted to send subscriber information to the XMPP client 132 via the connection. The connection could be a TCP connection.

In the following, some use cases are described in detail. The use cases below do not cover all XMPP capabilities but focuses on those use cases where MSC-S functions can be reused.

In a first use case, a XMPP client 132 which is implemented on a mobile phone or mobile terminal 18 wants to register at a XMPP server 3 which is associated to the MSC-S of a mobile communication network. It is not necessary that the mobile terminal is CS associated to this network. To register the XMPP client 132 at the XMPP server 3 the client 132 has to construct an identity which is called the Jabber identity. The Jabber ID looks like the following: "user@jabberserver.tld/device". The term "user" identifies the user of this service, "jabberserver" refers to the domain name of the XMPP server 3 and "device" represents the actual device the user is using for the registration request. The term "tld" stands for a top level domain which could be a .com or .de domain or any other known domain. A user may have several parallel registrations via different devices or different XMPP client instances on the same device.

To construct the Jabber ID, the XMPP client 132 could use information from the SIM card of the mobile phone 18. The subscriber identity module (SIM) card contains e.g. the MSISDN number or the IMSI which can be user by the XMPP client 132 to construct a "user" for the Jabber ID. The MSISDN number is the Mobile Subscriber Integrated Services Digital Network Number. The IMSI is the abbreviation for the International Mobile Subscriber Identity. The domain name can be derived from the GPRS domain name of the Access Point Name (APN) as defined and stored also on the SIM card. The device can be constructed from the International Mobile Equipment Identity (IMEI) of the mobile phone. The constructed Jabber ID may look like the following: IMSI@XMPP.APNdomain.com/IMEI.

Another option would be that the operator sends a configuration text message, e.g. a SMS message, to configure the XMPP client on the mobile phone 18. This option leaves more freedom in the way the Jabber ID is constructed. Subscribers can then be distributed to multiple domains or domains different to the APN domain.

To register the XMPP client 132 at the XMPP server 3 associated to the MSC-S 2, the XMPP client 132 opens a connection to the XMPP server 3 in the MSC-S 2. The mobile terminal 18 uses a normal packet switched connection. This connection can be based on the Transmission Control Protocol (TCP) and can be established via a wireless LAN connection of a WLAN router 19 through the Internet 100 to the c2s component 36 of the XMPP server 3. Another way of connecting the XMPP client 132 to the XMPP server 3 is an established radio connection to a packet core network. The SGSN 15 and the GGSN 16 route the TCP connection the c2s component 36 of the XMPP server 3. The c2s component 36 handles this connection request and interrogates the GSM authentication module 28 of the MSC-S 2 to perform user authentication. The GSM authentication function 28 of the MSC-S 2 may have to retrieve authentication triplets from AUC via the home location register (HLR) 4. After successful authentication subscriber information is fetched from the database 27, e.g. the VLR, and the subscriber information is sent to the XMPP client 132 via the connection.

After the XMPP client 132 has been registered to the XMPP server 3 in the MSC-S 2, the mobile subscriber can start a chat session to any other already registered XMPP client. In case both clients are associated to the same XMPP server 3, the chat session is local to that XMPP server 3. The c2s component 36 receives chat related XMPP stanzas and will forward them to the XMPP session manager 34 via the XMPP stanzas router 35. The session manager 34 will determine whether the destination Jabber ID is currently available or offline.

Offline messages are stored in the VLR data storage 27 and will be delivered once the destination becomes available. If the destination JID is reachable, the session manager 34 forwards the message to the destination, via the stanzas router 35 and the responsible c2s instance of function 36.

The session manager 34 stays in control of the entire chat session. The session manager could report information about the chat session to the charging function 24 in the MSC-S 2. The operator is now able to charge e.g. duration of the chat, or the number of chat messages. It is also possible (not shown in the figures) to report the details of the chat session to a legal interception point.

In case the destination Jabber ID is not registered at the same local XMPP server 3, the XMPP session manager 34 tries to route the chat message to the destination XMPP server. This is done via the XMPP stanzas router 35 and the s2s component 33. The s2s component 33 reuses the existing IP core network interface 25 of the MSC-S 2. Also the same routing functional component 26 of the MSC-S 2 is reused in order to resolve the destination address and determine the appropriate physical core network interface. Also in this case charging information is collected and provided to the charging function 24, and legal interception, if applicable, can be performed.

Similar actions are performed if a remote XMPP client wants to reach the local associated XMPP client 132. In this case the message arrives at a core network interface 25 of the MSC-S 2. The routing function 26 determines that this message is targeted to the internal XMPP server 3 and forwards the message to the s2s component 33, which forwards it via the XMPP stanzas router 35 to the XMPP session manager 34.

In the context of XMPP, a Jingle call is handled in the same way as a chat session. A Jingle call is a peer-to-peer call between XMPP clients, where the negotiation occurs over the XMPP signalling channel and the media is exchanged over a data channel that is usually a dedicated non-XMPP transport channel. Therefore a Jingle call can also be termed as a Voice over IP call. Further information about the Jingle call is mentioned in the XMPP standard XEP-0166. The user plane details are negotiated end-to-end via the XMPP server, without XMPP server involvement. Also the user plane addresses are exchanged directly between the XMPP clients. Therefore the above described use cases for local and remote chats are also applicable for this use case. This applies also for the direction from a remote client towards a local client. Also the data collection for input to the charging function in the MSC-S can be used. The legal interception of the user plane has to be performed by devices in the IP backbone, to mirror the IP packet flow between the clients. Offline correlation is required to relate the collected XMPP Jingle signalling information with the IP flows.

One essential benefit of the XMPP enabled MSC-S 2 is that it efficiently allows to provide interworking between XMPP clients using Jingle for call setup and the existing fixed or wireless telephony networks.

On the other hand the XMPP server 3 integrated in the MSC-S 2 shall be based as much as possible on existing definitions, in order to allow reuse of already available XMPP server 3 implementations (open source or commercial products). The XMPP-concept of XMPP server component-connections is used to interconnect the MSC-S parts with the XMPP server 3 to provide legacy network breakout.

The XMPP standard XEP-0114 defines a Jabber Component Protocol. This protocol allows connecting external server components to a XMPP server 3. So the GSM Call Control function 23 of the MSC-S 2 uses this protocol to be connected to the XMPP server 3. When establishing the connection, the GSM Call Control function 23 registers a specific sub-domain of the XMPP server domain. Whenever the XMPP server 3 receives a stanza addressed with this registered sub-domain, the stanza will directly be routed by the stanzas router 35 to the external component GSM Call Control function 23.

For the interworking as such the Gateway Interaction according to the XMPP standard XEP-0100 provides additional information. E.g. when the XMPP client 132 wants to address an E.164 number in a Jingle call, it will use the following format: "E164Address@CSgateway.domain.com". The term "E164Address" is the telephone number in accordance with the E.164 standard of the ITU-T, "CSgateway" is the sub-domain registered by the GSM Call Control function 23 when connecting as a component to the XMPP server 3. The term "domain" would be the domain used by the operator for his XMPP service. When the GSM Call Control function 23 received the Jingle call request, it will decide based on a destination number analysis whether to route it to the core network interface 25 located in the MSC-S 2 or, if the destination is a mobile terminal 18 associated to the same MSC-S 2, terminate it locally.

XMPP clients can use the Service Discovery mechanism in accordance with the XMPP standard XEP-0030 to discover the telecom breakout service offered by the XMPP server 3 integrated in the MSC-S 2. In this scenario the existing charging and legal intercept mechanisms can be fully reused.

Instead of storing the XMPP Server related subscriber data into the VLR 27 allocated to the MSC-S 2, it also possible to store it into an external database. One important embodiment of an external database is the Common Usage Database (CUDB), which is also used in mobile networks to centralize all subscriber data. Access to the CUDB is done via HLR-front-ends in a backward compatible way. If a network deploys a front-end-central database approach it would also prefer to store the XMPP data into such CUDB. The XMPP server data can be stored and access e.g. using a Lightweight Directory Access Protocol (LDAP) or other commonly used database access protocols.

Figure 7:
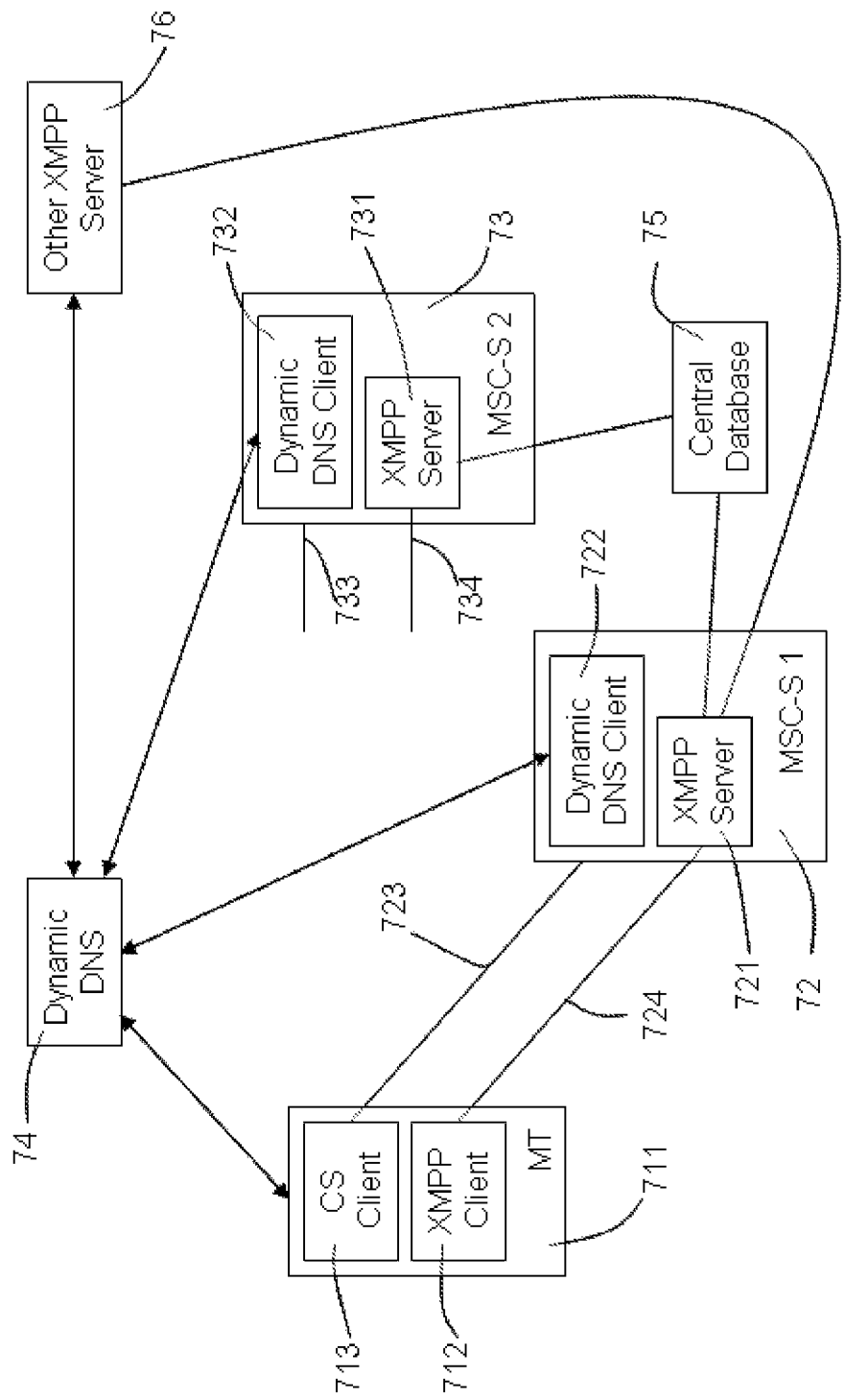
FIG. 7 shows a schematic diagram of an embodiment of a communication network including several communication servers and mobile switching nodes.

FIG. 7 shows another embodiment of the invention. A mobile terminal 711 comprises a CS client 713 which is adapted to establish a communication with a CS mobile communication network over a radio network 17. In this embodiment the mobile terminal 711 is CS attached 723 over the CS client 713 to a mobile switching node 72, which can be a MSC-S. The mobile terminal 711 comprises further a communication client 712 which can be a XMPP client or any other instant messaging client which is connected via a XMPP access interface 724 with a communication server 721 which is in this embodiment a XMPP server. The XMPP server is associated to the MSC-S 72. A further MSC-S 73 exists which also comprises a XMPP server 731 with an XMPP access interface 734. A further XMPP server 76 is shown in this figure which might be a stand-alone server in the Internet. All XMPP servers 721, 731, 76 are connected with each other over their server to server (s2s) components 33 via a network (e.g. IP network). The MSC-S 72, 73 comprise a Dynamic Domain Name System (DNS) client 722, 732 which are connected to a Dynamic DNS server 74. The Dynamic DNS clients 722, 732 are also connected with other components inside the MSC-S 72, 73, especially to the integrated XMPP server 721, 731. The Dynamic DNS server 74 is further connected to the mobile terminal 711 and to the other XMPP server 76. A central database 75 is connected to the XMPP servers 721, 731. The central database 75, which could be the Home Location Register (HLR) of a mobile communication network, comprises subscriber related data which can be fetched by the XMPP servers 721, 731 or the MSC-S 72, 73. Therefore the XMPP servers 721, 731 in the different MSC-S 72, 73 are set-up in a way that they do not store subscriber specific data locally but use a central database 75 for dynamic and static data storage. By this it is ensured that any of the XMPP server 721, 731 can handle any of the subscribers or mobile terminals 711. On activation of the XMPP server instance 721, 731 it fetches the needed data from the central database 75 and caches them locally (e.g. in the VLR or any other local database) or will always store and retrieve data from the central database 75 directly.

The mechanism how a XMPP client 712 finds its responsible server is by DNS resolving the own JID domain. Therefore the XMPP client fetches the address from the Dynamic DNS server 74. The same mechanism is used by external XMPP servers 76 from different domains to route terminating XMPP traffic between XMPP servers 721, 76.

In order to change the DNS resolution of the Jabber ID (MD) domain according to the XMPP server allocation, dynamic DNS is used. To achieve this, the central DNS server entity 74 is upgraded to support real-time dynamic change of the configuration of domain resolution to IP addresses. When a CS client 713 registers into a new MSC-S, e.g. via a location update procedure or an IMSI attach, the registration function in the MSC-S 72, 73 will determine the physical address of its integrated XMPP server 721, 731. This IP address information is then fed into the Dynamic DNS client 722, 732 in the MSC-S, which then updates the configuration of the Dynamic DNS Server 74 to match the domain of the XMPP client to the IP address resolution.

With this dynamic storage of DNS information it is possible to move the responsible XMPP server 721, 731 along with the serving MSC-S when the mobile terminal with the integrated XMPP client 712 and the CS client 713 roams between different locations. The responsible XMPP server 721, 731 can therefore always uses the local VLR data, MSC-S configuration, local core network interfaces, charging relations and other MSC-S resources. It is assumed that every MSC-S 72, 73 have an XMPP server 721, 731 integrated as mentioned before.

The invention claimed is:

1. A method of registering an instant messaging client at an instant messaging server, wherein the instant messaging client is associated to a mobile terminal and wherein the instant messaging server is configured to use functions of a mobile switching node of a circuit switched network, the method comprising:

initiating a connection between the instant messaging server that is configured to use the functions of the mobile switching node and the instant messaging client that is associated to the mobile terminal;

receiving identification information at the instant messaging server from the instant messaging client via the connection;
interrogating an authentication module of the mobile switching node to perform a user authentication by the instant messaging server;
fetching subscriber information from a database by the instant messaging server;
sending the subscriber information to the instant messaging client via the connection;
receiving by the instant messaging server from the instant messaging client an instant message comprising a destination ID not registered at the instant messaging server; and
forwarding the instant message by the instant messaging server to a destination instant messaging server,
wherein at least one part of the identification information is stored in a Domain Name System, DNS, server in combination with an IP address of the instant messaging server, the DNS server being connected to the instant messaging server and the destination instant messaging server.

2. A method according to claim 1, wherein the database is a visitor location register, VLR, that is associated to the mobile switching node.

3. A method according to claim 1, wherein the database fetches the subscriber information from a central database.

4. A method according to claim 1, wherein parts of the identification information are determined from a subscriber identity module, SIM, associated with the mobile terminal.

5. A method according to claim 4, wherein a first part of the parts of the identification information is derived from a Mobile Subscriber Integrated Services Digital Network Number, MSISDN or an International Mobile Subscriber Identity, IMSI, contained within the SIM.

6. A method according to claim 5, wherein a second part of the parts of the identification information is derived from an International Mobile Equipment Identity, IMEI.

7. A method according to claim 4, wherein a part of the parts of the identification information is derived from an Access Point Name, APN.

8. A method according to claim 1, wherein the mobile terminal is circuit switched, CS, connected via a radio network to the mobile switching node and wherein the method further comprises sending the IP address of the instant messaging server, which is associated to the mobile switching node, to the DNS server in combination with the at least one part of the identification information of the instant messaging client.

9. A method according to claim 1, wherein the method further comprises receiving a text message by the instant messaging client, the text message containing configuration information.

10. A method according to claim 9, wherein the text message is a Short Message Service, SMS, message.

11. A method according to claim 1, further comprising:
retrieving, by the instant messaging client, a Mobile Subscriber Integrated Services Digital Network Number, MSISDN or an International Mobile Subscriber Identity, IMSI, associated with the mobile terminal, an International Mobile Equipment Identity, IMEI, associated with the mobile terminal, and a domain name associated with an Access Point Name, APN, associated with the mobile terminal; and
constructing an XMPP instant messaging ID, wherein the XMPP instant messaging ID comprises a user identifier comprising the MSISDN or the IMSI, a device identifier comprising the IMEI, and a domain identifier comprising the domain name associated with the APN,
wherein the identification information comprises the instant messaging ID.

12. A method according to claim 11,
wherein the instant message is an XMPP instant message,
wherein the instant messaging client is an XMPP instant messaging client,
wherein the instant messaging server is an XMPP instant messaging server,
wherein the XMPP instant messaging ID is a Jabber identity comprising a format of user@domainname.tld/device,
wherein the user portion of the Jabber identity is the user identifier comprising the MSISDN or the IMSI,
wherein the domainname portion of the Jabber identity is the domain identifier comprising the domain name associated with the APN,
wherein the tld portion of the Jabber identity is a top level domain that is associated with the domain identifier, and
wherein the device portion of the Jabber identity is the device identifier comprising the IMEI.

13. A method of supporting a communication between a first instant messaging client that is registered at a first instant messaging server, and a second instant messaging client that is registered at a second instant messaging server, wherein the first instant messaging client is associated to a mobile terminal, and wherein the first instant messaging server is logically associated to a mobile switching node of a circuit switched, CS, network, the method comprising:
updating a configuration of a Dynamic Domain Name System, DNS, server that is connected to the first instant messaging server and the second instant messaging server to match a domain name of the first instant messaging client to an IP address of the first instant messaging server, the domain name of the first instant messaging client comprising identification information of the first instant messaging client;
sending communication data between the first instant messaging client and the first instant messaging server over a connection between the first instant messaging client and the first instant messaging server; and
routing the communication data between the first instant messaging server and the second instant messaging server over a core network interface of the mobile switching node.

14. A method according to claim 13, wherein the mobile terminal is CS connected via a radio network to the mobile switching node.

15. A method according to claim 14, wherein the method further comprises fetching addresses of the first instant messaging client and the second instant messaging client from the DNS server when the communication data is routed between the first instant messaging server and the second instant messaging server.

16. A method according to claim 13, wherein the core network interface is an IP core network interface.

17. A method according to claim 13, wherein the connection is a Transmission Control Protocol, TCP, or a HTTP based connection.

18. A method according to claim 13, wherein the method further comprises providing charging data to a charging function of the mobile switching node based on the communication data.

19. A method according to claim 13, wherein the first instant messaging server is integrated in the mobile switching node.

20. A method according to claim 19, wherein the mobile switching node is a mobile service switching centre server, MSC-S.

21. A method according to claim 13, wherein the first and second instant messaging clients are first and second Extensible Messaging and Presence Protocol, XMPP, clients, respectively, and the first and second instant messaging servers are first and second XMPP servers, respectively.

22. A method according to claim 13,
wherein the communication data is an XMPP instant message,
wherein the first instant messaging client is a first XMPP instant messaging client,
wherein the first instant messaging server is a first XMPP instant messaging server,
wherein the first instant messaging client is registered at the first instant messaging server with a Jabber identity comprising a format of user@domainname.tld/device,
wherein the user portion of the Jabber identity is derived from a Mobile Subscriber Integrated Services Digital Network Number, MSISDN or an International Mobile Subscriber Identity, IMSI, associated with the mobile terminal,
wherein the domainname portion of the Jabber identity is derived from is a domain name associated with an Access Point Name, APN, associated with the mobile terminal,
wherein the tld portion of the Jabber identity is derived from a top level domain that is associated with the domain name, and
wherein the device portion of the Jabber identity is derived from an International Mobile Equipment Identity, IMEI, associated with the mobile terminal.

23. A mobile switching node of a circuit-switched, CS, network comprising:
an instant messaging server that is adapted to register with an instant messaging client over a client to server component,
wherein the instant messaging client is associated to a mobile terminal,
wherein the instant messaging server of the mobile switching node comprises the client to server component,
wherein the client to server component is adapted to initiate a connection between the instant messaging server and the instant messaging client, receive identification information from the instant messaging client by the connection, interrogate an authentication module of the mobile switching node to perform a user authentication, fetch subscriber information from a database, and send the subscriber information to the instant messaging client via the connection,
wherein the instant messaging server receives from the instant messaging client an instant message comprising a destination ID not registered at the instant messaging server,
wherein the instant messaging server forwards the instant message to a destination instant messaging server, and
wherein at least one part of the identification information is stored in a Domain Name System, DNS, server in combination with an IP address of the instant messaging server, the DNS server being connected to the instant messaging server and the destination instant messaging server.

24. A mobile switching node according to claim 23, wherein the instant messaging client is an Extensible Messaging and Presence Protocol, XMPP, client and the instant messaging server is an XMPP server.

25. The mobile switching node according to claim 23, wherein the identification information comprises an XMPP instant messaging ID, the instant messaging ID comprising:
a user identifier comprising a Mobile Subscriber Integrated Services Digital Network Number, MSISDN or an International Mobile Subscriber Identity, IMSI, associated with the mobile terminal;
a device identifier comprising an International Mobile Equipment Identity, IMEI, associated with the mobile terminal; and
a domain identifier comprising a domain name associated with an Access Point Name, APN, associated with the mobile terminal.

26. The mobile switching node according to claim 25,
wherein the instant message is an XMPP instant message,
wherein the instant messaging client is an XMPP instant messaging client,
wherein the instant messaging server is an XMPP instant messaging server,
wherein the XMPP instant messaging ID is a Jabber identity comprising a format of user@domainname.tld/device,
wherein the user portion of the Jabber identity is the user identifier comprising the MSISDN or the IMSI,
wherein the domainname portion of the Jabber identity is the domain identifier comprising the domain name associated with the APN,
wherein the tld portion of the Jabber identity is a top level domain that is associated with the domain identifier, and
wherein the device portion of the Jabber identity is the device identifier comprising the IMEI.

27. A mobile switching node of a circuit-switched network, CS, comprising:
a core network interface adapted to connect the mobile switching node to the circuit-switched network;
an instant messaging server adapted to communicate to an instant messaging client that is associated to a mobile terminal; and
a dynamic Domain Name System, DNS, client that is adapted to update a configuration of a Dynamic Domain Name System, DNS, server that is connected to the instant messaging server and a further instant messaging server to match a domain name of the instant messaging client to an IP address of the instant messaging server, the domain name of the instant messaging client comprising identification information of the instant messaging client,
wherein the instant messaging server comprises a client to server component adapted to send communication data to the instant messaging client, and wherein the core network interface is further adapted to route communication data from a server to server component of the instant messaging server to the further instant messaging server.

28. The mobile switching node according to claim 27,
wherein the communication data is an XMPP instant message,
wherein the instant messaging client is an XMPP instant messaging client, and
wherein the instant messaging server is an XMPP instant messaging server, wherein the instant messaging client is registered at the instant messaging server with a Jabber identity comprising a format of user@domainname.tld/device, wherein the user portion of the Jabber identity is derived from a Mobile Subscriber Integrated Services Digital Network Number, MSISDN or an International Mobile Subscriber Identity, IMSI, associated with the mobile terminal, wherein the domainname portion of the Jabber identity is derived from is a domain name associated with an Access Point Name, APN, associated with the mobile terminal, wherein the tld portion of the Jabber identity is derived from a top level domain that is associated with the domain name, and wherein the device portion of the Jabber identity is derived from an International Mobile Equipment Identity, IMEI, associated with the mobile terminal.

* * * * *